(12) United States Patent
Lagorgette et al.

(10) Patent No.: US 11,428,298 B2
(45) Date of Patent: Aug. 30, 2022

(54) DEVICE FOR ROTATING A TOOTHED WHEEL

(71) Applicant: ETA SA Manufacture Horlogere Suisse, Grenchen (CH)

(72) Inventors: Pascal Lagorgette, Bienne (CH); Pascal Meyer, Neuchatel (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 831 days.

(21) Appl. No.: 16/286,653

(22) Filed: Feb. 27, 2019

(65) Prior Publication Data

US 2019/0277376 A1 Sep. 12, 2019

(30) Foreign Application Priority Data

Mar. 9, 2018 (EP) ..................................... 18160980

(51) Int. Cl.
*F16H 19/02* (2006.01)
*F16H 19/04* (2006.01)
(Continued)

(52) U.S. Cl.
CPC .............. *F16H 19/02* (2013.01); *F16H 19/04* (2013.01); *F16H 31/001* (2013.01); *G04C 3/12* (2013.01);
(Continued)

(58) Field of Classification Search
CPC ........ F16H 19/02; F16H 19/04; F16H 31/001; G04B 11/02; G04C 3/12; H02N 2/026; H02N 2/046
See application file for complete search history.

(56) References Cited

U.S. PATENT DOCUMENTS

| | | |
|---|---|---|
| 3,297,889 A | 1/1967 | Breskend |
| 3,509,714 A | 5/1970 | Walton |
| (Continued) | | |

FOREIGN PATENT DOCUMENTS

| | | |
|---|---|---|
| CN | 102692863 A | 9/2012 |
| CN | 203835235 U | 9/2014 |
| (Continued) | | |

OTHER PUBLICATIONS

European Search Report dated Jan. 2, 2019 in European Application 18160980.1, filed on Mar. 9, 2018 ( with English translation of categories of Cited Documents).

(Continued)

*Primary Examiner* — David M Fenstermacher
(74) *Attorney, Agent, or Firm* — Oblon, McClelland, Maier & Neustadt, L.L.P.

(57) ABSTRACT

A device for rotating a toothed wheel, including a linear piezoelectric motor including: a passive element having an elongated shape, a piezoelectric actuator capable of axially moving the passive element in a bidirectional manner, a transmission member fastened to the passive element, meshing with a toothing of the wheel in such a way as to rotate the wheel by one tooth in a first direction of rotation when the passive element is moved axially in a first direction of movement, a jumper mobile between two end positions, including a lowered position in which it blocks a rotation of the wheel in a second direction of rotation opposite to the first direction of rotation.

12 Claims, 2 Drawing Sheets

(51) Int. Cl.
*F16H 31/00* (2006.01)
*H02N 2/02* (2006.01)
*G04C 3/12* (2006.01)
*H02N 2/04* (2006.01)
*G04B 11/02* (2006.01)

(52) U.S. Cl.
CPC ............ *H02N 2/026* (2013.01); *H02N 2/046* (2013.01); *G04B 11/02* (2013.01)

(56) References Cited

U.S. PATENT DOCUMENTS

| | | | | |
|---|---|---|---|---|
| 3,614,486 A | * | 10/1971 | Smiley | B41J 9/36 |
| | | | | 251/303 |
| 3,694,681 A | * | 9/1972 | Horstmann | G04C 5/005 |
| | | | | 310/21 |
| 3,790,827 A | * | 2/1974 | Brunet | G04C 3/12 |
| | | | | 310/326 |
| 4,871,939 A | * | 10/1989 | Clouser | H02N 2/101 |
| | | | | 310/330 |
| 6,657,361 B1 | * | 12/2003 | Morales Serrano ... | H02N 2/008 |
| 6,768,245 B2 | * | 7/2004 | Mock | H02N 2/001 |
| | | | | 310/323.02 |
| 7,119,478 B1 | * | 10/2006 | Mentesana | H02N 2/101 |
| | | | | 310/328 |
| 2007/0029197 A1 | | 2/2007 | DiFoggio et al. | |
| 2007/0164635 A1 | | 7/2007 | Witteveen et al. | |
| 2008/0149348 A1 | | 6/2008 | DiFoggio et al. | |
| 2008/0303380 A1 | * | 12/2008 | Takeuchi | H02N 2/062 |
| | | | | 310/317 |
| 2014/0146645 A1 | | 5/2014 | Lagorgette et al. | |
| 2014/0319965 A1 | | 10/2014 | Someya | |
| 2016/0181951 A1 | | 6/2016 | Qiu et al. | |

FOREIGN PATENT DOCUMENTS

| | | |
|---|---|---|
| EP | 2 735 923 A1 | 5/2014 |
| FR | 2 034 030 | 12/1970 |
| JP | 2014-106231 A | 6/2014 |
| JP | 2014-217124 A | 11/2014 |

OTHER PUBLICATIONS

Korean Office Action dated Oct. 20, 2020 in Korean Patent Application No. 10-2019-0027101 (with English translation), 8 pages.
Combined Chinese Office Action and Search Report dated Jul. 16, 2020 in Patent Application No. 201910175083.0 (with partial English language translation), 11 pages.

* cited by examiner

DEVICE FOR ROTATING A TOOTHED WHEEL

CROSS-REFERENCE TO RELATED APPLICATION

This application claims priority to European Patent Application No. 18160980.1 filed on Mar. 9, 2018, the entire disclosure of which is hereby incorporated herein by reference.

FIELD OF THE INVENTION

The invention relates to the technical field of devices for rotating toothed wheels by means of linear piezoelectric motors.

BACKGROUND OF THE INVENTION

A linear piezoelectric motor conventionally comprises a passive element and an actuator allowing to linearly move the passive element by using the piezoelectric effect. In reference to FIG. 1, the linear piezoelectric motors 10 for which the passive element is an elongated element 20 (for example a bar having a rectangular cross-section) and the piezoelectric actuator comprises a resonator 30 formed from a pair of arms 31, 32 connected to one another at a connection zone 33, substantially in the shape of a tuning fork or a U, are in particular known. The actuator further comprises two piezoelectric elements (not shown), each attached to one of the arms 31, 32, and playing the role of means for excitation of the arms in order to impose vibrations on them. On the other hand, the passive element 20 extends substantially in parallel to the arms 31, 32 of the resonator 30, its axial guiding being provided by guide means 50 located at a distance from the resonator. The passive element 20 is also in local contact with the free ends 310, 320 of the arms 31, 32 of the resonator 30, in such a way that the passive element 20 is moved axially by friction of the free ends 310, 320 of the arms 31, 32 on the contact region.

In uses in which it is important to reduce the footprint of the piezoelectric motor, in particular in the horological field, the arms 31, 32 of the resonator 30 must have a small length, which limits the maximum linear travel of the passive element 20. The axial translation of the passive element 20 in the direction of the connection zone 33 is limited by the presence of said connection zone 33 which acts as a stop, and its axial movement in the other direction is limited by the length of the arms 31, 32. This limited travel is problematic in certain situations, in particular if the passive element 20 meshes with a wheel 60, for example via a rack system 70, since the rotation of the wheel 60 is thus restrained. For example, if the travel of the passive element 20 is limited to approximately 1 millimetre, then the diameter of the wheel 60 must be at most approximately 0.3 millimetres in order for said wheel 60 to be able to carry out a complete rotation during the travel. This dimension is too small to be technically feasible.

SUMMARY OF THE INVENTION

The goal of the present invention is to allow a complete rotation of the wheel without increasing the maximum linear travel of the passive element.

For this purpose, according to a first aspect, the invention relates to a device for rotating a toothed wheel, comprising:

a linear piezoelectric motor comprising:
- a passive element having an elongated shape,
- a piezoelectric actuator capable of axially moving the passive element in a bidirectional manner,
- a rigidly-connected transmission member fastened to the passive element, meshing with a toothing of the wheel in such a way as to rotate the wheel by one tooth in a first direction of rotation when the passive element is moved axially in a first direction of movement,
- a jumper mobile between two end positions, including a lowered position in which it blocks a rotation of the wheel in a second direction of rotation opposite to the first direction of rotation.

Upon each linear movement of the passive element in the first direction of movement carried out via the piezoelectric actuator, the wheel rotates by one tooth in the first direction of rotation via the transmission member. Upon each linear movement of the passive element in a second direction of movement opposite to the first carried out via the piezoelectric actuator, the wheel remains immobile via the lowered jumper. The wheel can thus carry out a complete rotation in the first direction of rotation via repeated to-and-fro movements of the passive element.

In a first embodiment of the invention, the rotation device comprises return means tending to return the jumper to the lowered position when the jumper is deviated therefrom under the effect of a rotation of the wheel in the first direction of rotation. The return means are for example elastic means, allowing to maintain the jumper against the toothing of the wheel when the wheel rotates in the first direction of rotation.

This first embodiment is particularly adapted to ratchet wheels. Initially, the jumper bears inside the toothing of the ratchet wheel (it is in the lowered position). When the passive element moves in the first direction of movement, it causes a rotation of the wheel by one tooth in the first direction of rotation, via the transmission member which pushes the ratchet of the wheel with which it comes in contact. The jumper is raised under the effect of the passage of the ratchet of the wheel with which it comes in contact, then returns to its lowered position as soon as said ratchet has passed, under the effect of the return means. However, when the passive element moves in the second direction of movement, a rotation of the wheel in the second direction of rotation is prevented by the jumper. Thus, via successive movements of the passive element forward and backward, a complete rotation of the wheel in the first direction of rotation can be carried out.

In a second embodiment of the invention:
- the transmission member meshes with the toothing of the wheel in such a way as to rotate the wheel by one tooth in the second direction of rotation when the passive element is moved axially in a second direction of movement opposite to the first direction of movement,
- the jumper, in its lowered position, blocks a rotation of the wheel in the first direction of rotation.

This second embodiment is advantageous since it allows a choice of rotating the wheel in the first direction of rotation or thus in the second direction of rotation. The wheel, however, cannot be a ratchet wheel: indeed, the transmission member must be capable of rotating the wheel by one tooth in the second direction of rotation when the jumper is not in the lowered position and the passive element is moved in the second direction of movement. Upon each axial movement of the passive element in the second direction of movement carried out via the piezoelectric actuator, the wheel rotates by one tooth in the second direction of rotation via the transmission member. Upon each linear movement of the passive element in the first direction of movement via the piezoelectric actuator, the wheel remains immobile via the lowered jumper. The wheel can thus carry out a complete rotation in the second direction of rotation via repeated to-and-fro movements of the passive element.

In a specific mode of the second embodiment, the rotation device comprises actuation means allowing to switch the jumper from one end position to the other. The actuation means comprise for example a second linear piezoelectric actuator allowing to move the jumper towards and away from the wheel.

The position of the jumper is thus controlled independently: the wheel cannot remove the jumper from the lowered position like in the first embodiment.

In a non-limiting embodiment, the piezoelectric actuator comprises a resonator comprising a pair of arms connected at one of their ends at a connection zone, the two other ends being called free, the passive element passing between the free ends of said arms in such a way as to be moved axially by friction of the free ends on its surface.

Such an actuator has a small footprint, in particular a small thickness, and is easy to manufacture and to assemble.

In one embodiment, the rotation device comprises means for axial guiding of the passive element tending to return the passive element to its initial position when the passive element is deviated therefrom under the effect of an axial movement of the passive element combined with a blocking of the wheel in rotation.

Indeed, when the passive element is rewound, that is to say, returns to its initial position after having rotated the wheel by one tooth, it can be raised under the effect of contact between the transmission member and the next tooth that the transmission member will have to push in order to rotate once again the wheel. The guide means allow to prevent the passive element from being knocked out of alignment, by returning it to its initial alignment.

According to a second aspect, the invention relates to a piece of clockwork comprising a wheel and a rotation device according to one of the embodiments presented above.

In one embodiment, the piece of clockwork comprises a hand integral in rotation with the wheel.

According to a third aspect, the invention relates to a method for rotating a toothed wheel by means of a rotation device according to one of the embodiments presented above, comprising the following successive steps:
  A: by means of the piezoelectric actuator, axially moving the passive element in a first direction of movement,
  B: by means of the transmission member, rotating the wheel by one tooth in a first direction of rotation,
  C: placing the jumper in the lowered position,
  D: by means of the piezoelectric actuator, axially moving the passive element in a second direction of movement.

In an embodiment allowing to rotate the wheel by more than one tooth, the steps A, B, C and D are repeated as many times as necessary.

In a specific embodiment of the invention, the method further comprises the following successive steps:
  E: by means of the piezoelectric actuator, axially moving the passive element in the second direction of movement,
  F: by means of the transmission member, rotating the wheel by one tooth in a second direction of rotation,
  G: placing the jumper in the lowered position,
  H: by means of the piezoelectric actuator, axially moving the passive element in the first direction of movement.

The method can further comprise the following step, carried out after the step H: repeating the steps E, F, G and H.

BRIEF DESCRIPTION OF THE DRAWINGS

Other particularities and advantages will be clear from the description thereof given below, for informational purposes and in no way limiting, in reference to the appended drawings, in which.

DETAILED DESCRIPTION OF PREFERRED EMBODIMENTS

Figure 1:
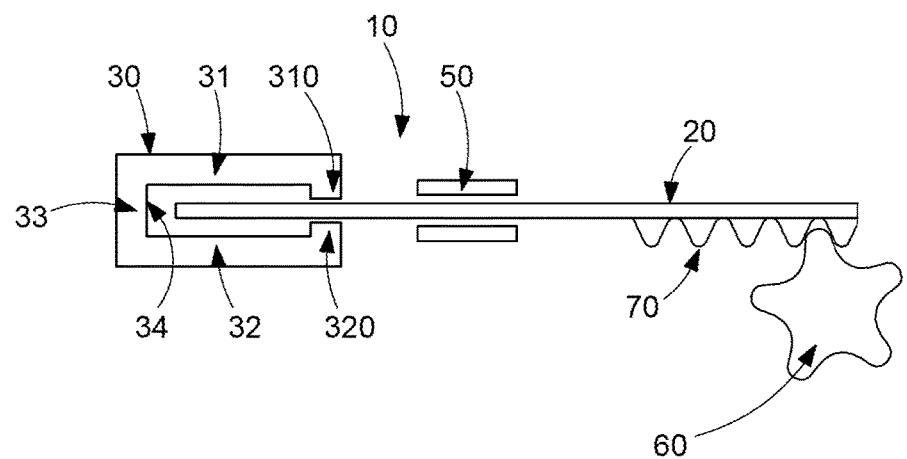
FIG. 1, already described, schematically shows a rotation device according to the prior art, FIG. 2 schematically shows a rotation device according to a first embodiment of the invention, FIG. 3 schematically shows a rotation device according to a second embodiment of the invention, FIG. 4 schematically shows a block diagram of the steps of a method for rotating a wheel according to an embodiment of the invention.
Figure 2:
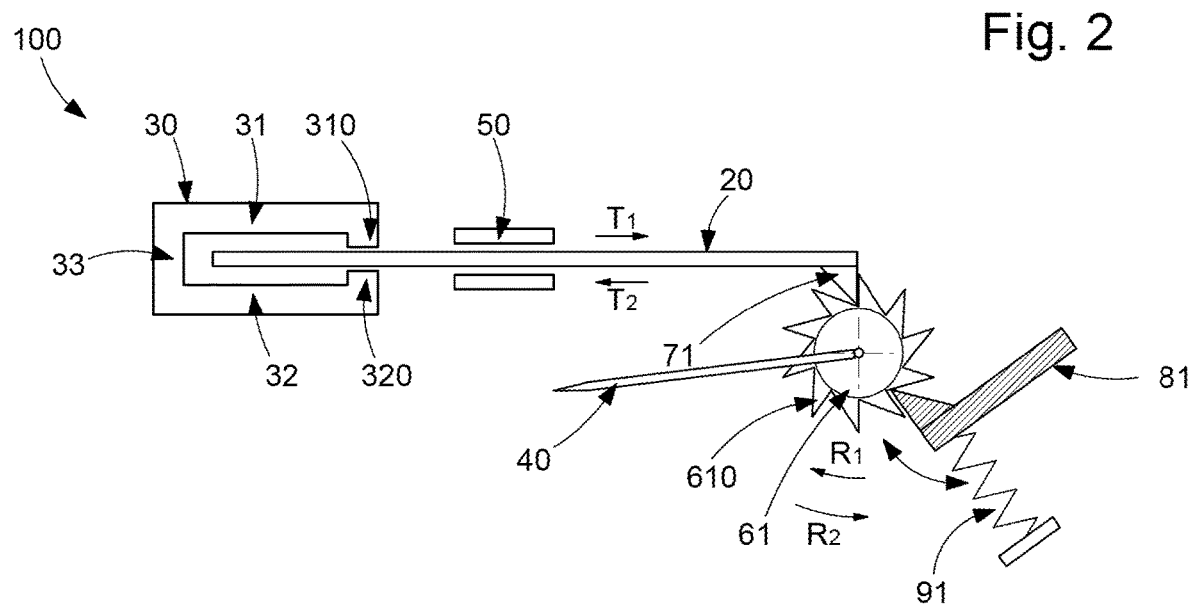
Figure 3:
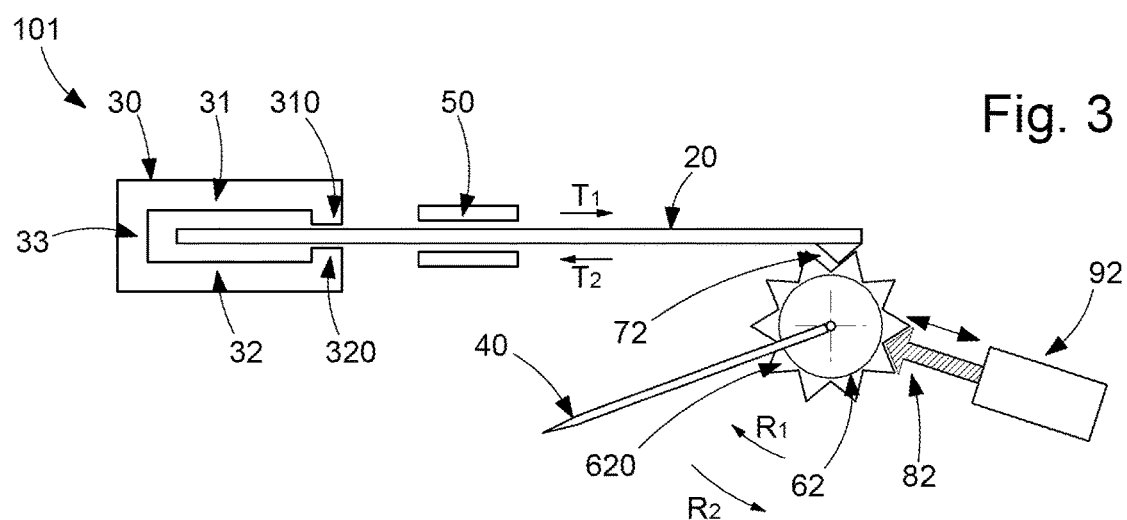

FIG. 2 shows a device 100 for rotating a wheel 61 according to a first embodiment of the invention, and FIG. 3 shows a device 101 for rotating a wheel 62 according to a second embodiment of the invention. In both cases, the rotation device 100, 101 comprises a piezoelectric motor. The piezoelectric motor comprises a passive element 20 having an elongated shape, and a piezoelectric actuator allowing to translate (that is to say, linearly/axially move) the passive element 20 by using the piezoelectric effect.

In the embodiment illustrated, the piezoelectric actuator comprises piezoelectric-excitation means, not shown, and a resonator 30 comprising two arms 31, 32 capable of oscillating. The excitation means advantageously consist of two portions, each attached to a different arm. However, other embodiments of the excitation means are possible, they can for example consist of a single portion disposed at a joint between the arms. During the application of an adapted voltage to the excitation means, the excitation means are deformed, and mechanical stresses are transmitted to the arms 31, 32 which thus begin to oscillate. By an appropriate design and assembly of the excitation means on the arms, multidimensional oscillations having a desired shape can be realised.

The arms 31, 32 are connected at a connection zone 33, and extend substantially in parallel to one another from said connection zone 33. The resonator 30 thus has the overall shape of a tuning fork, that is to say, a U shape. However, this shape is not limiting. The ends of the arms not connected at the connection zone 33, are called free ends 310, 320. The amplitude of the oscillations of the arms 31, 32 is maximum at these ends 310, 320.

The passive element 20 extends substantially in parallel to the arms 31, 32 and passes between the free ends 310, 320 of said arms 31, 32. Thus, the resonator 30 surrounds a first end zone of the passive element 20. The multidimensional oscillations of the free ends 310, 320 of the arms 31, 32 allow to impose an axial translation onto the passive element 20, via friction of said ends 310, 320 against the passive element 20. It is understood that the translation in the direction of the connection zone 33 is limited by said connection zone 33, and that the translation in the other direction is limited by the length of the arms 31, 32.

It is noted that the piezoelectric actuator could very well be of another type than that described above, the important thing being that it is capable of axially translating the passive element 20 in one direction of movement and in the other.

The rotation device 100, 101 also comprises means 50 for axial guiding of the passive element 20, allowing to maintain its orientation during its translation. The guide means 50 are arranged at a distance from the piezoelectric actuator. These are for example a rail.

The rotation device also comprises a transmission member 71, 72 and a jumper 81, 82. The transmission member 71, 72 and the jumper 81, 82 comprise a notch, the shape of which is advantageously adapted to the toothing of the wheel. The transmission member 71, 72 is fastened to a second end zone of the passive element 20, opposite with respect to the first end zone. The transmission member 71, 72 is disposed with respect to the wheel in such a way as to be able to make the wheel rotate in at least one direction of rotation when the passive element 20 is translated in a direction of movement under the action of the piezoelectric actuator. The jumper 81, 82 is mobile between two end positions. In one of these positions, called lowered position, the jumper 81, 82 is wedged between two teeth of the wheel 61, 62.

In the first embodiment illustrated in FIG. 2, the wheel 61 is a ratchet wheel, intended to only rotate in a first direction of rotation R1. A rotation in the first direction of rotation R1 is only possible via the transmission member 71 when the passive element 20 is translated in a first direction of movement T1: the transmission member 71 comes in contact with and then pushes one of the ratchets 610 of the wheel 61, making the wheel 61 rotate by one tooth.

In the first embodiment, the rotation device 100 comprises return means 91 in the form of an elastic element, for example a spring or a blade, tending to push the jumper 81 against the ratchets of the wheel. When the wheel 61 rotates in the first direction of rotation R1, the jumper 81 is raised under the passage of a wheel, and returned to the lowered position under the effect of the return means 91, in such a way as to substantially follow the shape of the toothing. Naturally, when the jumper is in the lowered position, the ratchet wheel 61 cannot rotate in a second direction of rotation R2 opposite to the first direction of rotation R1.

Thus, during a translation of the passive element 20 in the direction of movement T1, the ratchet wheel 61 rotates by one tooth, and during a translation of the passive element 20 in a direction of movement T2 opposite to the direction of movement T1, the ratchet wheel 61 is immobilised by the jumper 81. By carrying out a plurality of to-and-fro movements of the passive element 20, it is possible to rotate the wheel 61 in the first direction of rotation R1 by a plurality of teeth. A small maximum travel of the passive element 20 thus suffices.

Figure 4:
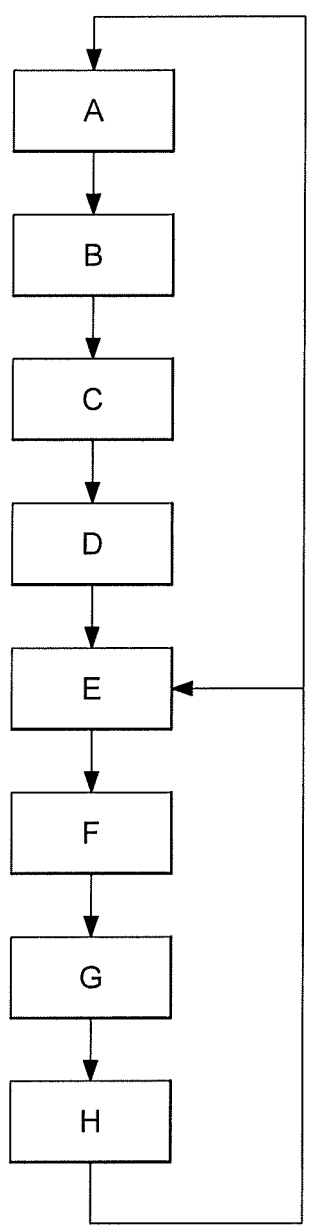

In reference to FIG. 4, it is understood that the method for rotating the wheel 61 by means of the rotation device 100 described above, comprises the following steps:
  step A: by means of the piezoelectric actuator 30, axially moving the passive element 20 in the first direction of movement T1,
  step B: by means of the transmission member 71 pushing against a tooth 610 of the wheel 61, rotating the wheel 61 by one tooth in the first direction of rotation R1,
  step D: by means of the piezoelectric actuator 30, axially moving the passive element 20 in the second direction of movement T2, the jumper being maintained in the lowered position by the return means 91 (step C),
  repeating the steps A, B, C, D as many times as necessary.

In the second embodiment illustrated in FIG. 3, the wheel 62 has a conventional toothing: it is designed to rotate in the first direction of rotation R1 as well as in the second direction of rotation R2. A rotation in the first direction of rotation R1 is possible via the transmission member 71 when the passive element 20 is translated in the first direction of movement T1, and a rotation in the second direction of rotation R2 is possible via the transmission member 71 when the passive element 20 is translated in the second direction of movement T2.

In the second embodiment, the rotation device 100 comprises actuation means 92 in the form of a second linear piezoelectric actuator (but which could be in other forms, the important thing being that it is an active element, contrary to the first embodiment), capable of controlling the position of the jumper 82. If it is desired to rotate the wheel 62 in the first direction of rotation R1, the transmission member 72 must be moved in the first direction of movement T1 via the passive element 20, in such a way as to rotate the wheel 62 by one tooth in the first direction of rotation R1. In parallel, the jumper 82 must be in the raised position, that is to say that it must not be in contact with the wheel 62 in order to not hinder its rotation. Then, the jumper 82 must be brought to the lowered position, in such a way as to block the wheel 61, and the transmission member 72 must be moved in the second direction of movement T2 via the passive element 20, in such a way as to be rewound. By carrying out a plurality of to-and-fro movements of the passive element 20, it is possible to rotate the wheel in the first direction of rotation R1 by a plurality of teeth.

On the contrary, if it is desired to rotate the wheel 61 in the second direction of rotation R2, the transmission member 72 must be moved in the second direction of movement T2 via the passive element 20, in such a way as to rotate the wheel 62 by one tooth in the second direction of rotation R2. In parallel, the jumper 82 must be in the raised position, that is to say that it must not be in contact with the wheel 62 in order to not hinder its rotation. Then, the jumper 82 must be brought to the lowered position, in such a way as to block the wheel 62, and the transmission member 72 must be moved in the first direction of movement T1 via the passive element 20, in such a way as to be rewound. By carrying out a plurality of to-and-fro movements of the passive element 20, it is possible to rotate the wheel in the second direction of rotation R2 by a plurality of teeth.

It is understood that the method for rotating the wheel 62 by means of the rotation device 101 described above, comprises the following steps:
  step A: by means of the piezoelectric actuator 30, axially moving the passive element 20 in a first direction of movement T1,
  step B: by means of the transmission member 72 pushing against a tooth 620 of the wheel 62, rotating the wheel 62 by one tooth in a first direction of rotation R1, the jumper being in the raised position,
  step C: placing the jumper 82 in the lowered position by means of the actuation means 92,
  step D: by means of the piezoelectric actuator 30, axially moving the passive element 20 in a second direction of movement T2 opposite to that of step A, the jumper being maintained in its lowered position,
  repeating steps A, B, C, D as many times as necessary.

In order to then rotate the wheel 62 in the other direction R2, the method for rotating the wheel 62 by means of the rotation device 101 described above, comprises the following successive steps:
  step E: by means of the piezoelectric actuator 30, axially moving the passive element 20 in the second direction of movement T2, step F: by means of the transmission member 72, rotating the wheel 62 by one tooth in a second direction of rotation R2, step G: placing the jumper 82 in the lowered position, step H: by means of the piezoelectric actuator 30, axially moving the passive element 20 in the first direction of movement T1, repeating steps E, F, G and H as many times as necessary.

It is noted that in both the first embodiment and the second, the rewinding of the passive element 20 is hindered by a tooth of the wheel 61, 62: during the rewinding, the end of the passive element 20 carrying the transmission member 71, 72 is thus raised, but is brought back to its initial inclination by the guide means as soon as the tooth has passed.

The rotation device 100, 101 according to one of the embodiments of the invention can very well be integrated into a piece of clockwork of the wristwatch type, in particular a piece of clockwork comprising a hand 40 coaxial to and integral in rotation with the wheel 61, 62. However, the rotation device according to one of the embodiments of the invention could be used to rotate not a hand, but a disc (for example a date disc or a lunar-phase disc), a wheel or a ring.

It is understood that various modifications and/or improvements and/or combinations obvious to a person skilled in the art can be made to the various forms of execution of the invention disclosed above without going beyond the context of the invention defined by the appended claims.

The invention claimed is:

1. A device for rotating a toothed wheel, comprising:
a linear piezoelectric motor comprising:
a passive element having an elongated shape,
a piezoelectric actuator capable of axially moving the passive element in a bidirectional manner,
a transmission member fastened to the passive element, meshing with a toothing of the wheel in such a way as to rotate the wheel by one tooth in a first direction of rotation when the passive element is moved axially in a first direction of movement, and
a jumper mobile between two end positions, including a lowered position wherein the jumper blocks a rotation of the wheel in a second direction of rotation opposite to the first direction of rotation, wherein
the transmission member meshes with the toothing of the wheel in such a way as to rotate the wheel by one tooth in the second direction of rotation when the passive element is moved axially in a second direction of movement opposite to the first direction of movement, and
the jumper, in the lowered position, blocks a rotation of the wheel in the first direction of rotation.

2. The rotation device according to claim 1, comprising return means tending to return the jumper to the lowered position when the jumper is deviated therefrom under the effect of a rotation of the wheel in the first direction of rotation.

3. The rotation device according to claim 2, wherein the return means are elastic means, allowing to maintain the jumper against the toothing of the wheel when the wheel rotates in the first direction of rotation.

4. The rotation device according to claim 1, comprising actuation means allowing to switch the jumper from one end position to the other.

5. The rotation device according to claim 4, wherein the actuation means comprise a second linear piezoelectric actuator allowing to move the jumper towards and away from the wheel.

6. The rotation device according to claim 1, wherein the piezoelectric actuator comprises a resonator comprising a pair of arms connected at first ends of the arms at a connection zone, and second ends of the arms being free ends, the passive element passing between the free ends of said arms in such a way as to be moved axially by friction of the free ends on a surface thereof.

7. The rotation device according to claim 1, comprising means for axial guiding of the passive element tending to return the passive element to an initial position when the passive element is deviated therefrom under the effect of an axial movement of the passive element combined with a blocking of the wheel in rotation.

8. A piece of clockwork comprising the rotation device according to claim 1.

9. The piece of clockwork according to claim 8, comprising a hand integral in rotation with the wheel.

10. A method for rotating a toothed wheel with a rotation device according to claim 1, comprising the following successive steps:
A: with the piezoelectric actuator, axially moving the passive element in a first direction of movement,
B: with the transmission member, rotating the wheel by one tooth in a first direction of rotation,
C: placing the jumper in the lowered position,
D: with the piezoelectric actuator, axially moving the passive element in a second direction of movement,
E: with the piezoelectric actuator, axially moving the passive element in the second direction of movement,
F: with the transmission member, rotating the wheel by one tooth in a second direction of rotation,
G: placing the jumper in the lowered position, and
H: with the piezoelectric actuator, axially moving the passive element in the first direction of movement.

11. The rotation method according to claim 10, comprising the following step, carried out after step D: repeating steps A, B, C and D.

12. The rotation method according to claim 10, comprising the following step, carried out after step H: repeating steps E, F, G and H.

* * * * *